(12) United States Patent
Hecking

(10) Patent No.: US 6,849,178 B2
(45) Date of Patent: Feb. 1, 2005

(54) APPARATUS FOR TREATING WATER BY MEANS OF AN ELECTRIC FIELD

(75) Inventor: Willi Hecking, Mönchengladbach (DE)

(73) Assignee: Hans Sasserath & Co. KG, Korschenbroich (DE)

( * ) Notice: Subject to any disclaimer, the term of this patent is extended or adjusted under 35 U.S.C. 154(b) by 73 days.

(21) Appl. No.: 10/217,579

(22) Filed: Aug. 12, 2002

(65) Prior Publication Data
US 2003/0029810 A1 Feb. 13, 2003

(30) Foreign Application Priority Data
Aug. 13, 2001 (DE) .......................... 101 38 625

(51) Int. Cl.[7] ............................................. C02F 1/48
(52) U.S. Cl. ................... 210/205; 210/243; 204/286.1; 205/742
(58) Field of Search ............................. 210/748, 198.1, 210/205, 243; 204/194, 280, 286.1, 660; 205/742; 422/186, 186.04

(56) References Cited

U.S. PATENT DOCUMENTS

| | | | | |
|---|---|---|---|---|
| 3,368,962 A | * | 2/1968 | Kramer | 204/660 |
| 3,933,606 A | * | 1/1976 | Harms | 205/743 |
| 4,107,024 A | * | 8/1978 | Fukuzuka et al. | 204/275.1 |
| 4,525,253 A | * | 6/1985 | Hayes et al. | 210/748 |
| 5,395,522 A | * | 3/1995 | Melanson et al. | 210/202 |
| 6,338,789 B1 | * | 1/2002 | Hecking | 205/742 |
| 6,613,201 B1 | * | 9/2003 | Hecking | 204/227 |

FOREIGN PATENT DOCUMENTS

| | | |
|---|---|---|
| DE | 19606979 A1 | 9/1996 |
| EP | 1 076 038 A2 | 2/2001 |
| EP | 1 076 038 A3 | 3/2002 |
| JP | 59-213491 A * | 12/1984 |

* cited by examiner

Primary Examiner—Frank M. Lawrence
(74) Attorney, Agent, or Firm—Mallinckrodt & Mallinckrodt

(57) ABSTRACT

An apparatus for water treatment by means of an electrical field is provided with an anode and a cathode in at least one treatment chamber through which the water to be treated passes. The apparatus is characterized in that the at least one treatment chamber forms a prismatic space with an elongated cross section, the anode and the cathode are formed by pairs of parallel, stick-shaped electrodes which extend spaced apart into said space and a voltage is applicable between the electrodes. One end of the at least one treatment chamber is connected to a water inlet and the other end of the at least one treatment chamber is connected to a water outlet, whereby a waterflow from one electrode to the other is generatable which is substantially transverse to the longitudinal axes of the electrodes.

28 Claims, 4 Drawing Sheets

APPARATUS FOR TREATING WATER BY MEANS OF AN ELECTRIC FIELD

BACKGROUND OF THE INVENTION

1. Field

The invention relates to an apparatus for treating water by means of an electric field. The apparatus has a treatment chamber. An anode and a cathode is arranged in this treatment chamber. When a preferably inhomogeneous electric field is applied between the anode and the cathode, seed crystals of minerals contained in the water are formed on the cathode. These seed crystals are separated from the cathode and carried away with the flowing water.

2. State of the Art

Drinking water contains essential minerals, among others calcium and magnesium carbonates. Such minerals, in total, are called water hardness. On one hand, such minerals are important to health. On the other hand, they may cause malfunction of the drinking water installation, in particular if the water is heated. When the water is heated in a drinking water heater, for example, insoluble lime depositions, also called boiler scale, are formed. This boiler scale is formed on the warm side of the installation. Boiler scale impedes heat transmission. In tubes, the boiler scale, over time, may result in closure of the tube installation downstream of the drinking water heater.

In order to avoid such deposits of boiler scale, the water can be "softened". This softening process removes the minerals from the drinking water. Such softening can be achieved by ion exchange or reverse osmosis. This avoids the deposit of boiler scale. In exchange therefor, however, the quality of the drinking water is reduced by the removal of the minerals, which, for other reasons, are desirable.

Methods of treating drinking water by means of so-called "electro-physical" apparatus cause the formation of seed crystals in the drinking water, which are then carried away by the drinking water. The formation of the seed crystals result in the drinking water thus treated causing less build up in the form of boiler scale, while the minerals in the drinking water are retained.

The treatment by means of electro-physical apparatus is substantially based on the following principle:

Drinking water always contains a certain proportion of carbon dioxide ($CO_2$) dissolved therein. This carbon dioxide forms a reaction equilibrium with the remaining components, calcium hydrogen carbonate ($Ca(HCO_3)_2$ being formed from $CaCO_3$ in accordance with the reaction equation

$$CaCO_3 + H_2O + CO_2 \rightleftharpoons Ca(HCO_3)_2$$

If the water is heated, $CO_2$ will escape from the water and boiler scale will be formed. It is, however, also possible to change purposefully the lime-carbon dioxide equilibrium in the drinking water.

If carbon dioxide is supplied to the water, this will result in shifting the equilibrium to the left in the above equation. Seed crystals of calcium carbonate (lime over-saturation) are formed from the calcium hydrogen carbonate present in the water. Then the subsequently formed calcium carbonate will be deposited predominantly on the once generated seed crystals, i.e. the seed crystals "grow".

This reaction is caused electrolytically in a treatment chamber containing a cathode and an anode. The seed crystals are formed on the cathode. The seed crystals have to be added to the drinking water after they have grown sufficiently. Then carbonate is already present in the form of seed crystals in the drinking water, when the drinking water is heated. There is no need of generating seed crystals anew. Accordingly, the carbonate will be deposited predominantly on the seed crystals carried away in the water rather than on the installation elements.

EP patent application 0,751,096 discloses an apparatus for the electro-physical drinking water treatment by means of an electric field wherein an electric field inhomogeneous in space is generated by an ac voltage superimposed on a dc voltage.

From EP 1 076 038 A2 an apparatus for electro-physical treatment of drinking water by means of an electrical field is known, in which a field inhomogeneous in space is generated using a cathode consisting of a plurality of metal pins. The pins extend through a perforated disc. The crystal seeds formed at the surface of the pins are mechanically removed by means of a motor. It is an object of this procedure to achieve a long dwell time of the seeds at the surface of the electrodes. An after-treatment chamber is arranged around the cathode consisting of the pins. Vertical graphite electrodes are arranged in the after-treatment chamber in a circular array. The graphite electrodes alternately are polarized as an anode and a cathode. Each of the electrodes therefore has two neighboring electrodes oppositely polarized. The electrodes in the after-treatment chamber change their polarization in regular time intervals.

The production of the known arrangement is expensive. The pins required for the generation of the inhomogeneous field need to be manufactured by hand. The insertion of the perforated disc is time consuming. Furthermore, the cathode is blocked after a while and must be cleaned. Therefore the apparatus has to be disassembled and the cathode has to be cleaned and inserted back into its place. This is expensive and time consuming also.

Furthermore, there is a known apparatus for the electro-physical treatment in which a voltage is applied to a granular mixture from graphite and silica sand. In this mixture the crystal seeds are generated. However, the granular mixture also acts as a filter and is blocked after long treatment durations. It then has to be replaced or serviced.

SUMMARY OF THE INVENTION

It is an object of the invention to overcome the above mentioned disadvantages and to provide a more cost-effective apparatus for the electro-physical treatment of water.

According to the invention this object is achieved in that (a) there is at least one treatment chamber which forms a prismatic space of an elongated cross section, (b) the anode means and the cathode means in each of the at least one treatment chamber are formed by a pair of parallel, stick-shaped electrodes which extend spaced apart in said space and a voltage is applicable between the electrodes (c) one end of the at least one treatment chamber is connected to a water inlet and the other end of the at least one treatment chamber is connected to a water outlet, whereby a waterflow from one electrode to the other is generatable which is essentially transverse to the longitudinal axis of the electrodes.

As used herein, "prismatic space" means a space that has substantially the same cross section throughout its height.

The electrodes can easily be manufactured and the arrangement is considerably less expensive. The electrodes can be individually exchanged or serviced if necessary. The invention is based on the surprising discovery that not only the growth of crystals, but also the generation of crystal seeds, is improved by high flow velocities at the cathode. An inhomogeneous field and a long dwell time at the cathode surface are not absolutely necessary. The crystal seeds are washed from the electrodes sufficiently by the flow transverse to the electrodes and the electrodes cannot be blocked. Even after a treatment of long duration, no accumulation or deposit can be found within the system. A brushing off of the crystal seeds by means of a motor is not necessary because the flow in the direct environment of the cathode effects a sufficient washing of crystals from the cathode.

In a preferred embodiment of the invention at least two pairs of electrodes are provided. The pairs of electrodes consisting of a cathode and an anode are preferably pairwise isolated from further pairs of electrodes. Thereby the electric fields which are generated between a pair of electrodes cannot influence the electric fields generated between the other pairs of electrodes.

Preferably the pairs of electrodes are arranged essentially in the shape of a ring. About five pairs of electrodes can be provided. In an embodiment of the invention the pairs of electrodes are arranged in a housing with an essentially pot-like shape. A flow guiding element can be provided which has cylinder-shaped hollow spaces for receiving the electrodes. Using such a flow guiding element two effects are achieved: the recess of the individual treatment chambers and the isolation therebetween. Preferably each two cylinder-shaped hollow spaces are connected via a slot, which connects the hollow spaces along their entire length. In the slot the water can flow from one electrode to another, where the electric field is generated also. Accordingly the electrodes in the hollow spaces which are connected to each other are preferably oppositely polarized, respectively.

In order to achieve particularly good flow guidance one hollow space of the pair of hollow spaces is connected to the outlet via a slot and the other hollow space is connected via at least one slot with the inlet of the treatment chamber. Preferably the flow guiding element consists of an electrically isolating material, such as plastic material.

Preferably the flow guiding element is produced with injection molding. In a particularly preferred embodiment the electrodes consist of a porous material with a large surface, for example, graphite. Due to the large surface more crystal seeds can be generated. Thereby the efficiency of the apparatus can be improved.

Means for changing the polarity of the electrodes can be provided. Also means for controlling the changes at regular time intervals, for example time intervals with a duration between 0.5 and 2 minutes can be provided. By this changing of polarity all seeds are washed out and the flow passage will not be blocked by the generated carbonate.

Preferably a plurality of flow guiding elements is arranged in one housing. In this case the flow guiding elements may be smaller and it is easier to produce them.

In a particularly advantageous embodiment of the invention a further treatment chamber with electrodes is provided for an after treatment. The after-treatment chamber is annularly arranged around the treatment chamber. The growth of the crystal seeds is improved in the after-treatment chamber. The annular arrangement is easy to produce and space saving. The compact arrangement enables a uniform flow in all areas of the after-treatment chamber. Preferably the electrodes in the after-treatment chamber are arranged in a ring with even spaces therebetween. Thereby a uniform distribution of currents is achieved. In a further embodiment of the invention the pair of electrodes or pairs of electrodes are each arranged in their own treatment chamber and each of these treatment chambers is connected to the after-treatment chamber. An increased flow can be generated in the respective treatment chambers. Furthermore, the pairs of electrodes are isolated from each other with respect to their individual flows, such that they do not interfere with each other. If an electric isolation is achieved at the same time, the electric fields do not interfere with each other either.

Isolating pins can be provided between the electrodes in the after-treatment chamber, the pins extending parallel to the electrodes. The pins provide a separation of the flows in the after-treatment chamber and an increased flow. Fixing elements can be provided for fixing the isolating pins to the flow guiding element.

Further embodiments are subject matter of the subclaims. A preferred embodiment is described hereinbelow with reference to the accompanying drawings.

THE DRAWINGS

DETAILED DESCRIPTION OF THE ILLUSTRATED EMBODIMENTS

Figure 1:
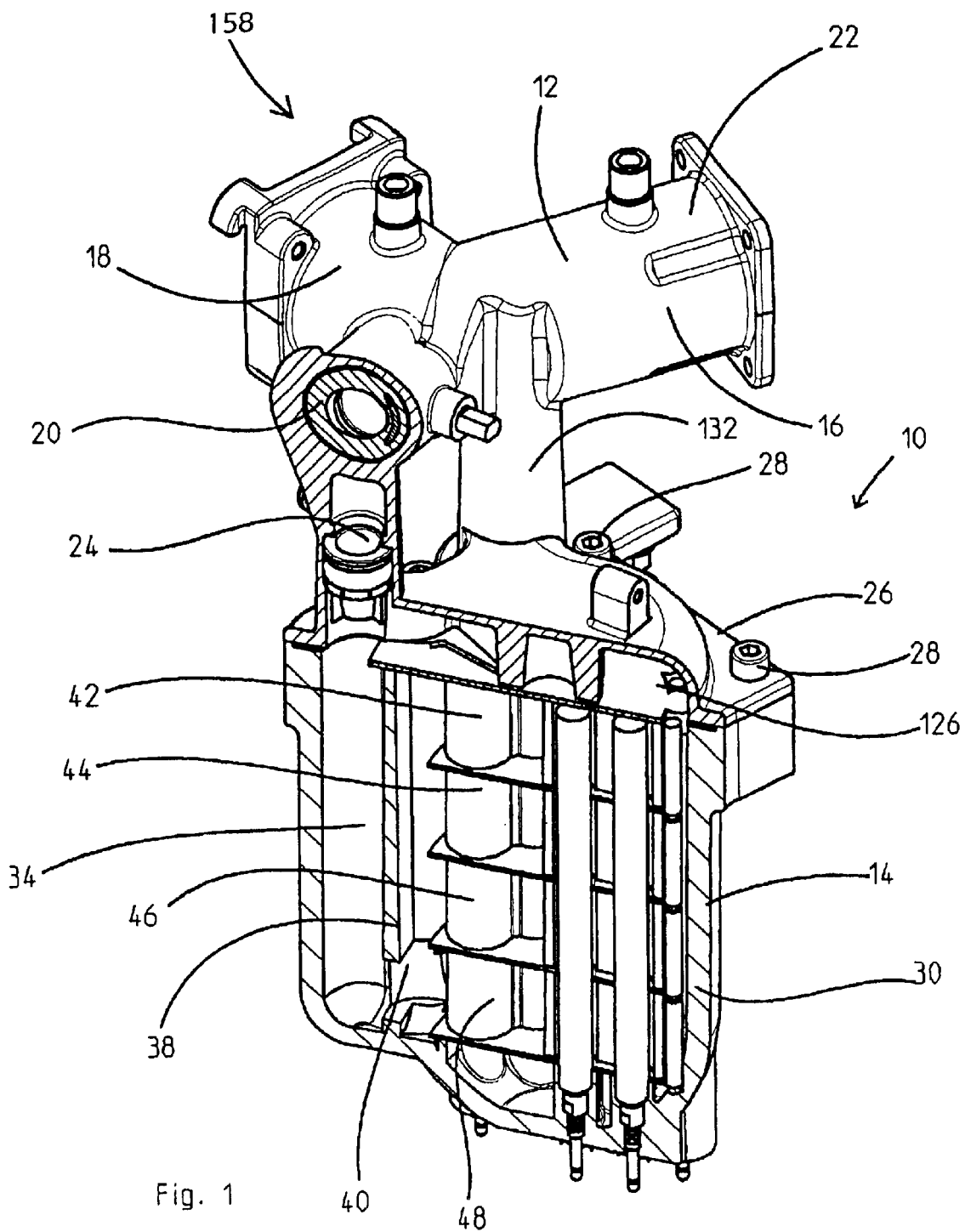
FIG. 1 is a perspective view of an apparatus for the electro-physical treatment of water.

In FIG. 1 numeral 10 denotes an apparatus for electro-physical treatment of water. The apparatus comprises a fitting part 12 and a water treatment unit 14 arranged therebelow. In the water treatment unit 14, a "dynamic treatment" of the water flowing therethrough is effected by means of electric fields.

Crystal seeds flowing in the water are generated by this treatment. The limestone dissolved in the water crystallizes at these crystal seeds, such that it flows in the form of small limestone crystals in the water. It does not lead to boiler scale at the walls and therefore closure due to boiler scale can be avoided.

In FIG. 1 the apparatus 10 is shown in a perspective view. The fitting part 12 has a Y-shaped passage body 16. The passage body 16 has three connecting sockets 18, 20 and 22. The passage body 16 is connected to the inlet 24 of the water treatment unit via the connecting socket 20. The inlet 24 is a portion of the cover 26, which is connected to the pot-shaped housing 30 with screws 28.

Figure 2:
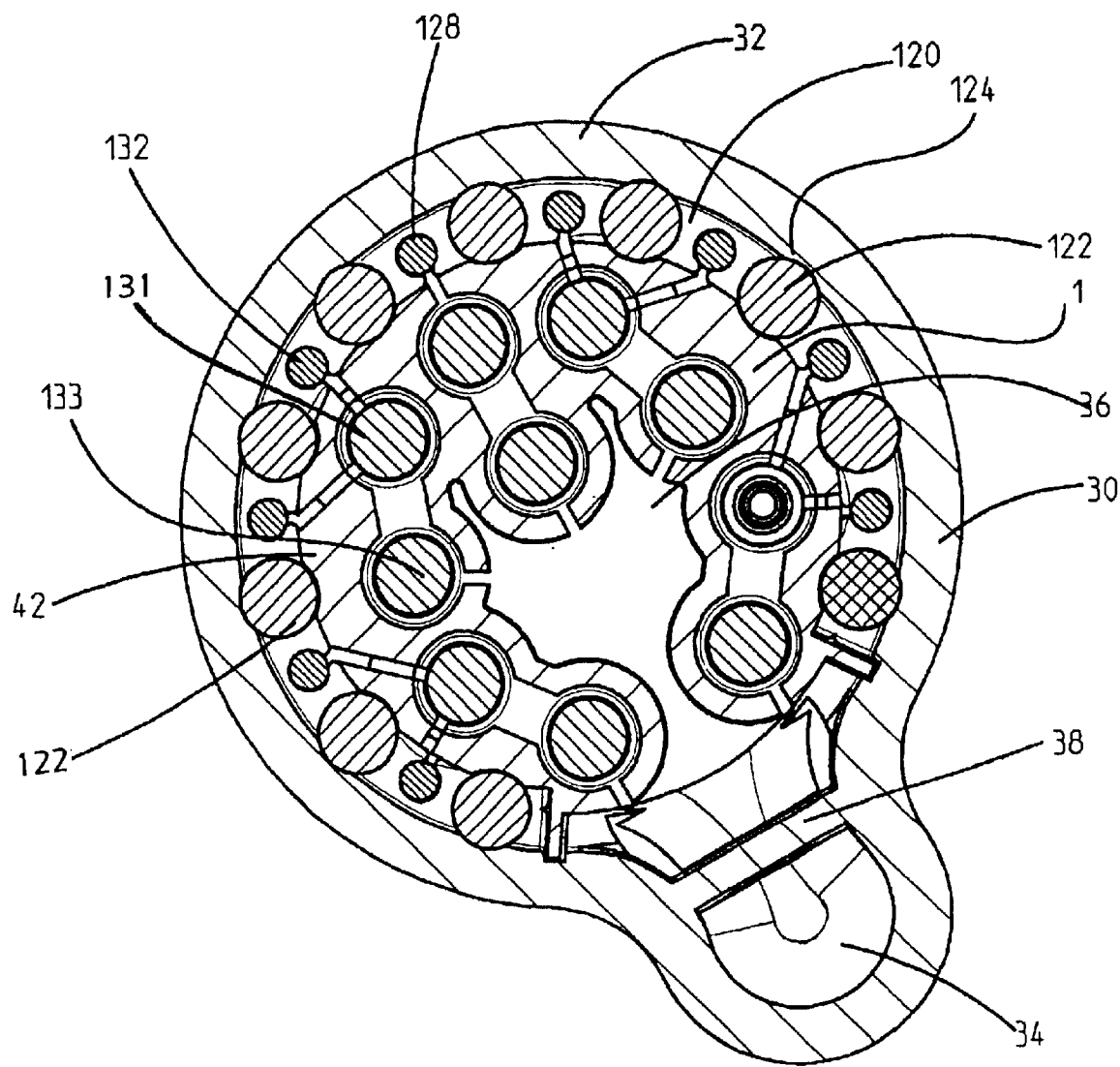
FIG. 2 is a cross-section of the housing with treatment chambers and an after-treatment chamber arranged around its periphery.

The inlet 24 forms the upper part in FIG. 1 of an inlet passage 34. The inlet passage 34 is formed into the housing 30 on its side and separated from the rest of the space enclosed by the housing wall 32 by an intermediate wall 38 (FIG. 2). The inlet passage 34 extends from the inlet 24 to an opening 40 (FIG. 1) connecting the inlet passage 34 with the space 36 (FIG. 2).

In the space 36 enclosed by the housing 30 four identical flow guiding elements 42, 44, 46 and 48 are provided. In an alternative embodiment only one single flow guiding element with a length four times as long is used. Smaller flow guiding elements are easier and therefore cheaper to produce.

Figure 3:
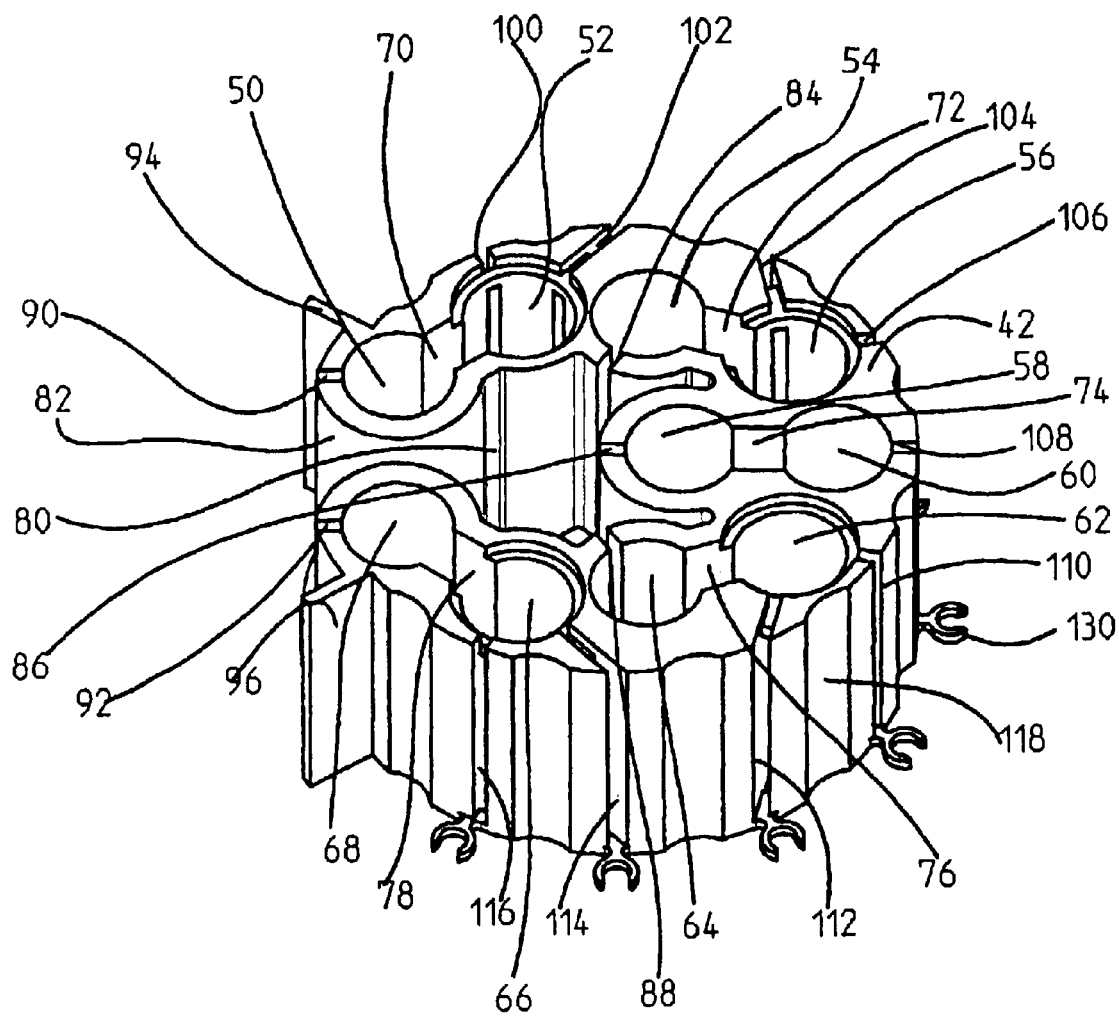
FIG. 3 is a perspective view of the flow guiding element.

In FIG. 3, such a flow guiding element 42 is separately shown. The flow guiding element 42 consists of plastic material and is produced by injection molding. The flow guiding element has a base body in the form of an essentially cylindrical hollow base body. In this base body cylindrical hollow spaces 50, 52, 54, 56, 60, 62, 64, 66 and 68 are arranged mainly in form of a ring along the periphery of the base body. The hollow space 58 is arranged a little bit further towards the middle of the ring. The longitudinal axes of the hollow spaces extend parallel to each other and parallel to the longitudinal axis of the base body.

Two hollow spaces are each connected by slots. The hollow spaces 50 and 52,54 and 56, respectively, are connected by a slot 70, or 72, respectively, extending mainly in a circumferential direction. The hollow spaces 58 and 60 are connected by a slot 74, extending mainly in a radial direction. The hollow spaces 62 and 64 or 66 and 68, respectively, are each connected by a slot 76 or 78, respectively, which again extends mainly in a circumferential direction. The connected hollow spaces, i.e., hollow spaces 50 and 52 with connecting slot 70, hollow spaces 54 and 56 with connecting slot 72, hollow spaces 58 and 60 with connecting slot 74, hollow spaces 62 and 64 with connecting slot 76, and hollow spaces 66 and 68 with connecting slot 78, each constitutes a treatment chamber forming a space having a constant or identical cross section through it height. As used herein, an open space having a substantially identical cross section through it height, is considered to be a prismatic space. Thus, each of the five separate treatment chambers form a prismatic space into which electrodes can be placed and through which water to be treated can be flowed.

The middle portion 80 of the base body 42 is also a hollow space. The hollow space extends on a side 82 as far as the periphery of the cylindric base body 42. The cylindrical hollow spaces 54, 58 and 64 are connected to the hollow space 80 in the middle portion via small slots 84, 86 and 88. The hollow spaces 50 and 68 are connected to the periphery at the side 82 of the base body 42 via small slots 90 and 92.

The area along the periphery on the side 82 is separated over the entire length of the base body from the rest of the area along the periphery by means of bridges 94 and 96 extending in a radial direction and connecting to the base body 42. Slots 100 and 102 at the periphery of the base body 42 connect the hollow space 52 with the outside of the base body 42. In the same way the slots 104 and 106 connect the outside with the hollow space 62 and slots 114 and 116 connect the hollow space 66 with the outside. The entire flow guiding element is symmetrical about the aperture and the diameter through the hollow spaces 58 and 60.

The circumference of the base body 42 furthermore is provided with recesses 118 extending along the entire length and uniformly distributed along the complete circumference. The recesses 118 each are arranged between two slots connecting the hollow spaces with the outside.

In FIG. 2 it is shown how the flow guiding element 42 is arranged in the housing 30. Between the flow guiding element 42 and the wall of the housing 32 there is a gap 120. The gap 120 is an after-treatment chamber extending along the entire length of the arrangement. In the after-treatment chamber 120, graphite electrodes 122 are arranged in even spaces therebetween. Like the recesses 118 in the flow guiding element 42 further recesses 124 are provided on the inside of the wall of the housing 32. The recesses are positioned opposite to each other. The electrodes 122 sit in the recesses 118 and 124 and are thereby held in their positions in such a way that no further fixing devices need to be provided for the electrodes. The after-treatment chamber 120 is divided into nine sub-chambers by the electrodes 122 connected only at their upper end within the cover of the housing, the inner space 126 of which forms an outlet (FIG. 1). However, along the length of the flow guiding elements the sub-chambers are not connected with each other. One slot from the treatment chamber each is connected to a sub-chamber of the after-treatment chamber 120.

In each sub-chamber of the after-treatment chamber 120, a pin 128 is arranged extending parallel to the electrodes. The pin 128 has a cylindrical shape and is arranged in the middle between the electrodes. The pin 128 improves the flow characteristics and has a positive effect on the growth of the crystals. The pin 128 has a smaller diameter than the width of the gap 120 between the flow guiding element 42 and the wall of the housing 30. Therefore the water can pass it. Each pin 128 is held by a fixing element 130 shaped in the form of half a ring, and connected to the flow guiding element 42 (FIG. 3).

Figure 4:
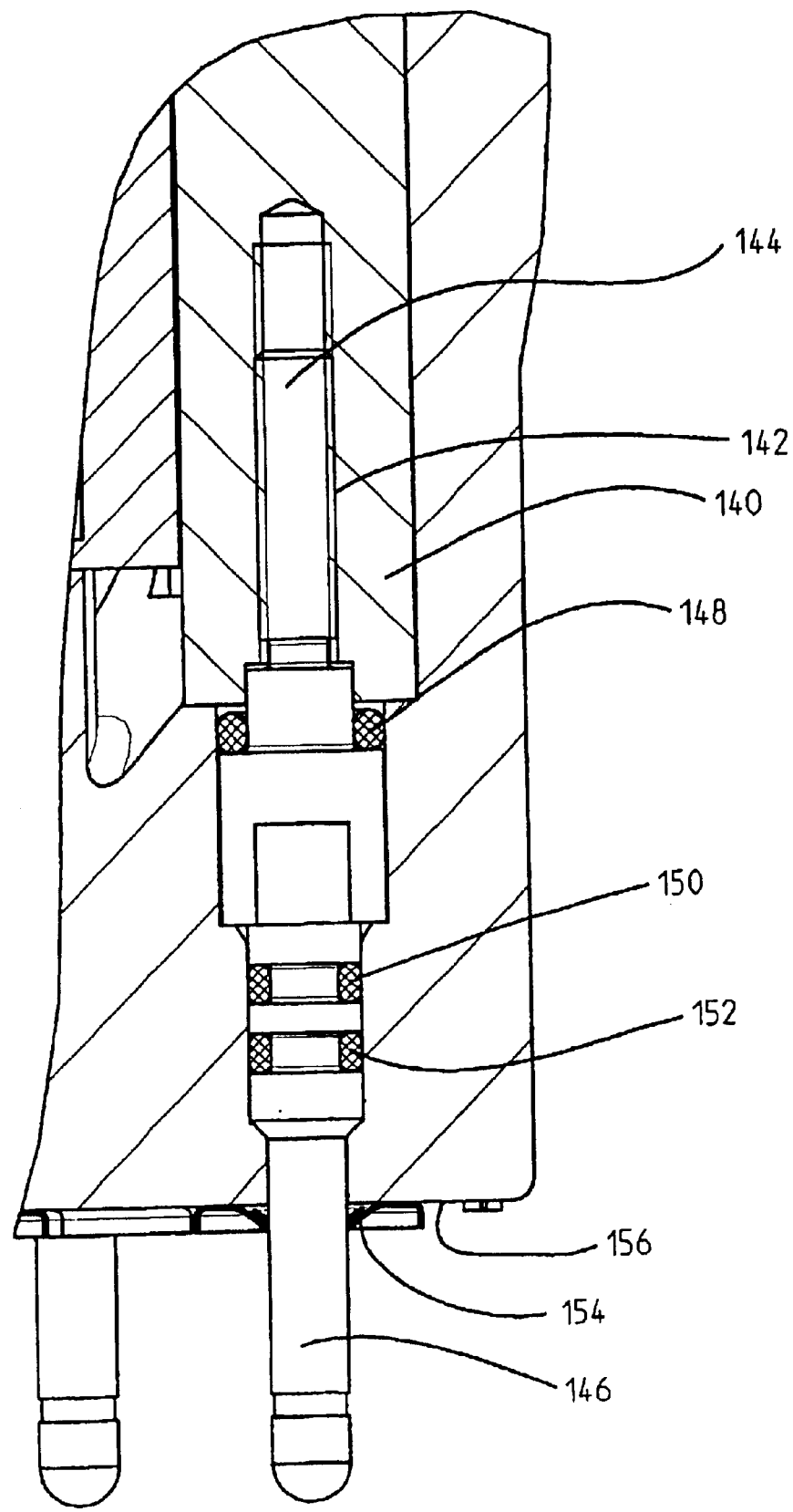
FIG. 4 is a cross-section of the fixing arrangement of the electrodes.

The fixing of the electrodes is shown in detail in FIG. 4. The electrode 14 (not completely shown) has a threaded bore 142 into which a metal pin 144 is screwed. The metal pin 144 is connected to a contact 146. Tightening rings 148, 150 and 152 are provided around the metal pin. Furthermore, a tightening plate 154 is provided underneath the bottom of the housing 156 of the treatment unit. For removing the electrode, the cover 26 of the housing 30 is removed and the graphite electrode 140 unscrewed from above. The electrode can easily be inspected, cleaned or replaced without influencing the electrical contacts.

The described arrangement operates as follows:

The water to be treated flows into socket 18 as indicated by arrow 158 and flows from the socket 18 through the passage body to the inlet 24 in the connecting socket 20. From the inlet 24 the water flows through the inlet passage 34 downwards through the opening 40 into the middle portion 80 of the flow guiding elements 42, 44, 46, and 48. From there the water is distributed to the treatment chambers through the slots 84, 86, 88,90 and 92, in each flow guiding element wherein the respective pairs of electrodes are arranged. Due to the small diameters of the gaps and slots an increased flow velocity in horizontal direction in FIG. 1, i.e. transverse to the longitudinal axis of the electrodes, is achieved.

The pairs of electrodes 131 and 133, i.e. one graphite electrode polarized as a cathode and one electrode polarized as an anode, are connected with a voltage source. The voltage is sufficient for the generation of crystal seeds. The crystal seeds are generated at the cathode in the inhomogeneous field between the electrodes. The electrodes are polarized with an opposite polarization at intervals of 60 seconds. Thereby the small gap cannot be blocked and the electrodes are used uniformly. The generated crystal seeds are washed with the water through further slots; for example slot 102, into a sub-chamber of the after-treatment chamber 120. In the field between the alternating anode and cathode polarized electrodes the seeds grow further. The polarization of the electrodes change at intervals of 60 seconds. The water now flows in a vertical direction upwards in FIG. 1 to a hollow space 126 formed by the cover 26. The hollow space 126 is connected to an outlet 132 extending to the connecting socket 22 of the passage body.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

I claim:

1. Apparatus for water treatment by means of an electrical field wherein the apparatus includes at least one treatment chamber and a plurality of anode and cathode pairs in the at least one treatment chamber wherein water to be treated passes through the at least one treatment chamber, characterized in that:
   (a) the at least one treatment chamber forms a prismatic space with an elongated cross section,
   (b) each anode and cathode pair is formed by a pair of parallel, pin-shaped electrodes having longitudinal axes forming an electrode pair and which extend spaced apart in said space and a voltage is applicable between the electrodes, each of said electrode pair being isolated from other electrode pairs and the electrode pairs are arranged essentially in the shape of a ring, and
   (c) one end of the at least one treatment chamber is connected to a water inlet and the other end of the at least one treatment chamber is connected to a water outlet, whereby a waterflow from one electrode to the other is generatable which is essentially transverse to the longitudinal axis of the electrodes.

2. Apparatus according to claim 1, characterized in that five pairs of electrodes are provided.

3. Apparatus according to claim 2, characterized in that the apparatus includes a housing with an essentially pot-like shape.

4. Apparatus according to claim 3, characterized in that a flow guiding element is provided with cylinder-shaped hollow spaces for receiving the electrodes.

5. Apparatus according to claim 4, characterized in that each two cylinder-shaped hollow spaces are connected via a slot, which connects the hollow spaces along their entire length.

6. Apparatus according to claim 5, characterized in that the electrodes in the hollow spaces which are connected to each other are oppositely polarized, respectively.

7. Apparatus according to claim 6, characterized in that one hollow space of the pair of hollow spaces is connected to the outlet via a slot and the other hollow space is connected via at least one slot with the inlet of the treatment chamber.

8. Apparatus according to claim 7, characterized in that the flow guiding element consists of an electrically isolating material.

9. Apparatus according to claim 8, characterized in that the flow guiding element consists of plastic material.

10. Apparatus according to claim 9, characterized in that the flow guiding element is producible with injection molding.

11. Apparatus according to claim 10, characterized in that the electrodes are graphite electrodes.

12. Apparatus according to claim 11, characterized by means for changing the polarity of the electrodes.

13. Apparatus according to claim 12, characterized by means for controlling the changes at regular time intervals.

14. Apparatus according to claim 13, characterized in that the duration of the time interval is between 0.5 and 2 minutes.

15. Apparatus according to claim 4, characterized in that a plurality of flow guiding elements is arranged in one housing.

16. Apparatus according to claim 1, characterized in that a further treatment chamber with electrodes is provided for an after treatment.

17. Apparatus for water treatment by means of an electrical field wherein the apparatus includes at least one treatment chamber and an anode and a cathode in the at least one treatment chamber wherein water to be treated passes through the at least one treatment chamber, characterized in that:
   (a) the at least one treatment chamber forms a prismatic space with an elongated cross section,
   (b) the anode and the cathode are formed by a pair of parallel, pin-shaped electrodes having longitudinal axes and which extend spaced apart in said space and a voltage is applicable between the electrodes, and
   (c) one end of the at least one treatment chamber is connected to a water inlet and the other end of the at least one treatment chamber is connected to a water outlet, whereby a waterflow from one electrode to the other is generatable which is essentially transverse to the longitudinal axis of the electrodes, and
   (d) an after-treatment chamber provided with electrodes being annularly arranged around the treatment chamber.

18. Apparatus according to claim 17, characterized in that the after-treatment chamber the electrodes are arranged in a ring with even spaces inbetween.

19. Apparatus according to claim 18, characterized in that the pair of electrodes or pairs of electrodes are each arranged in their own treatment chambers and each of these treatment chambers is connected to the after-treatment chamber.

20. Apparatus according to claim 19, characterized in that isolating pins are provided between the electrodes in the after-treatment chamber, which extends parallel to the electrodes.

21. Apparatus according to claim 20, characterized in that fixing elements are provided for fixing the isolating pins to a flow guiding element.

22. An apparatus for treating drinking water flowing therethrough by means of an electric field generated in the water between electrodes to cause the formation of seed crystals on said electrodes, said seed crystals being carried away by the flowing water, whereby minerals contained in the water tend to crystallize on said seed crystals and to be retained in the drinking water, while the formation of boiler scale is reduced, comprising:
   (a) a flow guiding element of insulating material, said flow guiding element defining therein a plurality of pairs of side-by-side cylindrical cavities having parallel cylinder axes,
   (b) said electrodes being cylindrical, and each of said cylindrical cavities containing one of said electrodes,
   (c) said flow guiding element further comprising an inlet chamber communicating with a water inlet, said flow guiding element comprising inlet passages communicating a first cylindrical cavity of each of said pairs with said inlet chamber,
   (d) said flow guiding element comprising outlet passages communicating the other, second cylindrical cavity of each of said pairs with an outlet,
   (e) said flow guiding element further comprising connecting passages interconnecting said cylindrical cavities of each of said pairs with each other, and
   (f) means for oppositely polarizing said electrodes of each of said pairs.

23. Apparatus according to claim 22, wherein said flow guiding element is a generally circular disc, said pairs of cavities being essentially arranged in a ring along the periphery of said flow guiding element, said inlet chamber being located inside said ring of pairs of cavities.

24. Apparatus according to claim 23, wherein:

(g) an after-treatment chamber is defined around said flow guiding element, (h) said after-treatment chamber containing axially extending after-treatment electrodes of alternating polarity separating said after-treatment chamber into sub-chambers, each outlet passage of said pairs of cavities of said flow guiding element communicating said second cavity of an associated one of said pairs with one of said sub-chambers, and (i) all of said sub-chambers of said after-treatment chamber communicating with a common outlet chamber, which, in turn, communicates with said outlet.

25. Apparatus according to claim 24, wherein each of said sub-chambers comprises an isolating pin between and parallel to said after-treatment electrodes peripherally restricting the free cross section of said sub-chamber.

26. Apparatus according to claim 22, wherein said inlet passage, said outlet passages, and said connecting passages are defined by slots extending axially through said flow guiding element over the height of said cylindrical cavities.

27. Apparatus according to claim 22, wherein said flow guiding element is an injection-molded plastic part.

28. Apparatus according to claim 22, wherein a plurality of substantially identical flow guiding elements are arranged in a common housing one on top of the other.

* * * * *